INVENTOR
LEANDER H. LIPPINCOTT
ATTORNEY

United States Patent Office 3,169,030
Patented Feb. 9, 1965

3,169,030
RELEASABLE ATTACHMENT DEVICE
Leander H. Lippincott, Middletown, Conn., assignor to United Aircraft Corporation, East Hartford, Conn., a corporation of Delaware
Filed May 26, 1961, Ser. No. 112,861
1 Claim. (Cl. 285—86)

This invention relates to an arrangement for releasably holding two telescoping sleeves in relative axial position and has particular utility in securing a rocket nozzle within a nozzle mounting.

One feature of the invention is a positive lock for the two telescoping sleeves which can be quickly inserted and equally quickly released by the removal of a retaining ring. Another feature is a segmented locking element to permit easy withdrawal of the locking portions of the element from locking position.

One particular feature is the positive attachment of a rocket nozzle within a nozzle mounting by a device which includes a segmental locking element for holding the nozzle in position together with a retainer ring which holds the segmental element in locked position to provide a positive attachment.

Other features and advantages will be apparent from the specification and claim, and from the accompanying drawing which illustrates an embodiment of the invention.

Figure 1:
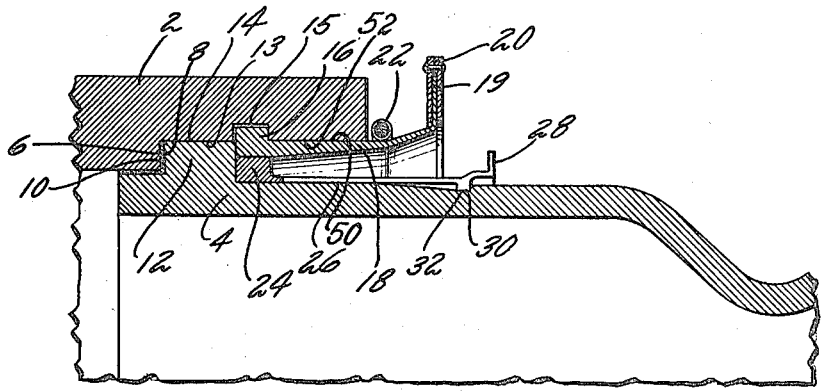
FIGURE 1 is a fragmentary sectional view through a rocket nozzle and mounting.
Figure 2:
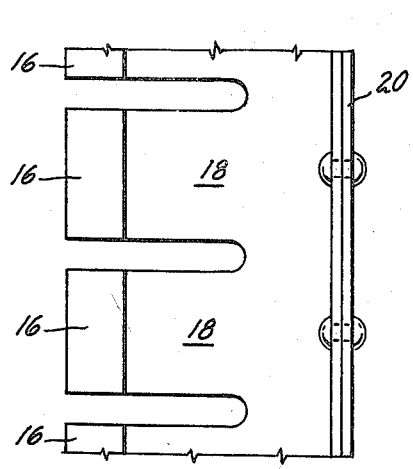
FIG. 2 is a showing of my locking element to illustrate partial segmentation.
Figure 3:
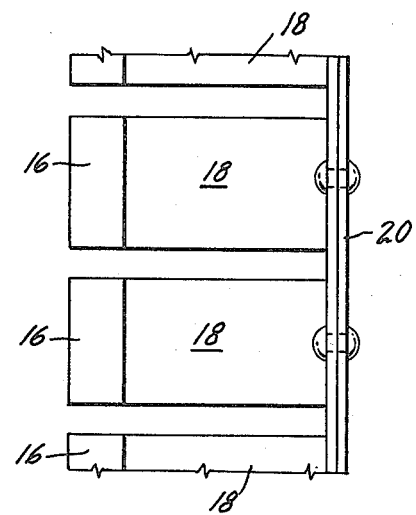
FIG. 3 is a showing of my locking element to illustrate total segmentation.

The device provides for releasably holding together the telescoping sleeves 2 and 4, the latter fitting within the former and being held against axial movement by the attachment device. In the arrangement shown, the sleeve 2 is a nozzle mounting and the inner sleeve 4 is the end of a rocket nozzle. The mounting 2 has a square cornered shoulder 6 thereon for engaging with a cooperating shoulders preventing relative axial movement between the mounting and nozzle in one direction. A seal ring 10 may be positioned between these two shoulders to prevent leakage.

The shoulder 8 is on a square cornered projecting rib 12 on the inner sleeve or nozzle and the cylindrical periphery 13 of the rib engages a cylindrical surface 14 on the mounting for piloting the sleeve or nozzle. The outer sleeve 2 has a square cornered, circumferential groove 15 of rectangular cross section formed in the inner surface thereof in a location adjacent to the rib 12. The groove 15 receives a projecting square cornered circumferentially extending flange 16 of rectangular cross section on the end of a sleeve 18. The opposite end of this sleeve projects beyond the end of the sleeve 2 and terminates in a radial flange 19. This flange has mounted thereon a circumferentially continuous retaining ring 20. The sleeve 18 is preferably divided into a number of segments thereby making possible the radial inward movement of the several segments to disengage the projecting rib 16 from the associated groove 15. The dimension of the rib 16 is such that the outer substantially cylindrical surface 50 of the sleeve 18 engages with the inner substantially cylindrical surface 52 of the outer sleeve 2 when the sleeve is in locking position so that flange 16 takes the loading between sleeves 2 and 4 in shear. As shown, the sleeve 18 engages with the end surface of the rib 12 so that the rib is clamped between the shoulder 6 and the sleeve 18. If desired, a garter spring may be mounted around the segmented sleeve 18 for normally urging the several segments of the sleeve radially inward into disengaged position.

For positively locking the projecting rib 16 within the groove 15, a retaining ring 24 is axially slidable on the peripheral surface 26 of the inner sleeve 4 so that in locking position the ring 24 is in radial alignment with the rib 15 and fills the space between sleeve 18 and the outer surface 26 of the inner sleeve at this point. The retaining ring 24 has a plurality of projecting fingers 28 extending axially to a point beyond the ring 20 to permit removal of the retaining ring 24. Each finger 28 has a projecting lug 30 on its inner surface fitting in a circumferential groove 32 in the periphery of the inner sleeve 4 when the ring 24 is in locking position so that the ring 24 will be held in position until deliberately released by moving the fingers 28 radially outward and subsequently withdrawing the ring 24 axially.

It will be understood that the ring 20 holds the several segments of the sleeve 18 together so that the group of segments may be inserted all at one time into the space defined between the inner and outer sleeves. Furthermore, by having the inner surface of the sleeve 18 somewhat conical as shown and by making the outer surface 26 of the inner sleeve 4 slightly tapered adjacent to the locking position of the ring 24, the insertion of the ring 24 will provide a wedging action to move the several sleeve segments 18 outwardly and place the rib 16 in locking position within the groove 15. Removal of the ring 24 and subsequently removal of the locking sleeve 18 from the space between the inner sleeve 4 and outer sleeve 2 will then permit the sleeve 4 to be withdrawn to the right from within the outer sleeve 2. If desired, for purpose of assembly the ring 24 may be made up of a plurality of segments rather than as a continuous ring.

It is to be understood that the invention is not limited to the specific embodiment herein illustrated and described, but may be used in other ways without departure from its spirit as defined by the following claim.

I claim:

A quick disconnect device having an axis and including cooperating inner and outer sleeves the adjacent ends of which are fitted one within the other, each of said sleeves having inner and outer surfaces, said inner surface of said outer sleeve having an inwardly projecting, square cornered shoulder spaced from the end thereof and further having an outwardly extending circumferential, square cornered groove of rectangular cross section positioned between said shoulder and said outer sleeve end and still further having cylindrical surfaces extending between said shoulder and said groove and between said groove and said outer sleeve end, said outer surface of said inner sleeve having a square cornered, outwardly projecting rib abutting said outer sleeve shoulder to prevent axial motion between said sleeves in a first axial direction and with a substantially cylindrical outer surface of selected axial dimension to extend between said outer sleeve shoulder and said groove and of selected radial dimension to engage said outer sleeve cylindrical surface between said shoulder and said groove, and said outer surface of said inner sleeve further having a circumferential groove spaced from said rib so as to be located outside of said outer sleeve when said shoulder and said rib abut, a locking member in the form of a sleeve separate from said inner and outer sleeves and having flexible fingers formed with inner surfaces spaced from said inner sleeve outer surface and terminating at one end in a square cornered, outwardly and circumferentially extending flange of rectangular cross section received in and abutting said outer sleeve groove and also abutting said rib to prevent axial movement of said sleeves in the opposite axial direction from said first direction and further having a substantially cylindrical outer surface engaging said outer sleeve inner cylindrical surface between said groove and said outer sleeve end so that said flange takes the loading between said inner and outer sleeves in shear, a garter spring enveloping said locking member sleeve to bias said flexible fingers radially inwardly and hence out of said outer sleeve groove and a retaining ring extending between and abutting said inner sleeve outer surface and the inner surface of said locking member radially below said circumferentially extending flange of said locking member to retain said locking member flange within said groove and also abutting said rib to prevent motion of said retaining ring in said first axial direction and having fingers projecting therefrom having square cornered lugs engaging said inner sleeve circumferential groove to prevent motion of said retaining ring in said opposite axial direction.

References Cited by the Examiner
UNITED STATES PATENTS

| | | | |
|---|---|---|---|
| 656,759 | 8/00 | Wirt | 285—82 |
| 975,138 | 11/10 | Lancaster | 285—81 |
| 2,212,571 | 8/40 | Martin | 285—81 |
| 2,386,562 | 10/45 | Mahoney | 285—81 |
| 2,426,526 | 8/47 | Rutishauser et al. | |
| 2,468,849 | 5/49 | Trainor | 285—314 |
| 2,500,334 | 3/50 | Zucrow. | |
| 2,784,987 | 3/57 | Corcoran | 285—316 X |

THOMAS F. CALLAGHAN, *Primary Examiner.*
CARL W. TOMLIN, SAMUEL LEVINE, *Examiners.*